United States Patent
Ma et al.

Patent Number: 5,425,233
Date of Patent: Jun. 20, 1995

[54] OPERATION OF AN INTERNAL COMBUSTION ENGINE

[75] Inventors: Thomas T. Ma, South Woodham Ferrers; Nicholas Collings, Cambridge, both of Great Britain

[73] Assignee: Ford Motor Company, Dearborn, Mich.

[21] Appl. No.: 162,210

[22] PCT Filed: Jun. 10, 1991

[86] PCT No.: PCT/GB92/01035
§ 371 Date: Dec. 10, 1993
§ 102(e) Date: Dec. 10, 1993

[87] PCT Pub. No.: WO92/22734
PCT Pub. Date: Dec. 23, 1992

[30] Foreign Application Priority Data

Jun. 12, 1991 [GB] United Kingdom ............... 9112601
Jun. 26, 1991 [GB] United Kingdom ............... 9113949
Oct. 11, 1991 [GB] United Kingdom ............... 9121596

[51] Int. Cl.⁶ ............................................. F01N 3/20
[52] U.S. Cl. ........................................ 60/274; 60/286; 60/289; 60/307
[58] Field of Search ................ 60/274, 285, 286, 289, 60/293, 307, 304

[56] References Cited

U.S. PATENT DOCUMENTS

| | | | |
|---|---|---|---|
| 3,744,249 | 7/1973 | August | 60/286 |
| 3,745,983 | 7/1973 | Sweeney | 60/276 |
| 3,911,676 | 10/1975 | Jensen | 60/301 |
| 4,098,078 | 7/1978 | Laurent | 60/274 |

*Primary Examiner*—Ira S. Lazarus
*Assistant Examiner*—Daniel J. O'Connor
*Attorney, Agent, or Firm*—Joseph W. Malleck; Roger L. May

[57] ABSTRACT

A method is described for reducing the total emissions during cold starts from an engine burning a hydrocarbon fuel and having an afterburner arranged upstream of a catalytic converter. The method comprises the steps of:

(i) adding an excess of fuel to the engine combustible charge and adding air to the engine exhaust gases immediately after the engine has first fired to assure the presence in the exhaust/air mixture of sufficient concentrations of hydrogen and oxygen to permit the resulting exhaust/air mixture to be ignitable and to burn with a steady flame in the afterburner while the latter is at a temperature close to the ambient temperature, and (ii) igniting the exhaust/air mixture in the afterburner immediately after the engine has first fired.

In the preferred embodiment of the invention, the excess fuel and/or the additional air are regulated after ignition has occurred in the afterburner to maintain a steady flame in the afterburner until at least part of the matrix of the catalytic converter has reached its light off temperature.

15 Claims, 2 Drawing Sheets

OPERATION OF AN INTERNAL COMBUSTION ENGINE

FIELD OF THE INVENTION

The present invention relates to a method of operating an internal combustion engine having an afterburner to reduce emissions during cold starts.

BACKGROUND OF THE INVENTION

An exhaust catalytic converter only performs its task of reducing the unburnt hydrocarbons, carbon monoxide and oxides of nitrogen content of the exhaust gases after it has reached a critical temperature, termed the light-off temperature, which is between 300° C. and 400° C. During cold starts, it is important to minimise the time taken for the catalyst to reach this temperature, more especially since the emission test drive cycles which are laid down by various legislations all include a cold start.

Various solutions have already been put forward to enable the light-off time to be reduced. The simplest solution is to place the catalyst very near the engine so that it is heated by the exhaust gases before these have been cooled by the exhaust system. This method of mounting a catalyst, usually termed close-coupling, creates problems when the engine is running under high speed and high load conditions. Under such conditions, the exhaust gas temperature can exceed 850° C., which is enough to cause permanent damage to the catalyst. It is therefore preferred not to provide a close-coupled catalyst but to use one mounted some distance away from the engine, normally termed an under-body catalyst. Such mounting is safe for high speed and high load operation but exacerbates the warm-up problem because the exhaust gases are cooled before reaching the catalyst during the start-up phase.

To speed up the warming of a catalytic converter, an external heat supply has been proposed, including electric heaters and microwave heaters. These proposals have involved significant additional cost and complexity, more especially when it is appreciated that the power requirement is of the order of 2 to 3 kilowatts, which with a 12 volts supply calls for a current of 166 to 250 amps.

It has also been proposed to use chemical energy to reduce light-off time by injecting fuel into the exhaust pipe and igniting it. The complexity in this case is that petrol/air mixtures do not always ignite reliably when diluted with exhaust gases from the engine and if they should fail to do so they aggravate the problem by cooling the catalyst and by dramatically increasing the hydrocarbon emissions in the exhaust. There are further complexities imposed by the need to ensure safety, it being inherently dangerous to provide a fuel line opening into a hot exhaust pipe.

A still further proposal has been the use of the so-called thermal reactor in which air is injected into the exhaust stream close to the exhaust port to intercept the exhaust gases while they are still hot. If the mixture is set slightly rich, the combustion reaction continues in the exhaust gases, albeit at a reduce rate, and this raises the temperature of the exhaust system to reduce the light-off time of the catalytic converter. Though this proposal works, the benefits one achieves by it are only of limited value. Typically, the light-off time would be reduced to around two minutes, which still falls short of enabling the more exacting permitted legal emission levels to be met.

A still further proposal has been to use an afterburner. The engine is once again run with a rich mixture and fresh air is added to the exhaust gas stream but this time the mixture is ignited, for example by a spark to burn within a chamber arranged immediately upstream of the converter.

It is important to differentiate between the reaction initiated by ignition in an afterburner and the reaction which normally takes place on the surface of a catalytic converter. In an afterburner, there is created a luminous open flame which propagates through the gases and is not confined to a surface. The ignition can be initiated by a spark, a pilot flame or indeed by a heated catalytic element. Once ignited the flame is not confined to the igniter and the gases burn as they would in an unconfined space.

The concept of an afterburner is not in itself new and it has been known since 1967 that under controlled conditions one can re-ignite the fuel in the exhaust mixture. In a report by C. D. Haynes published by the Motor Industry Research Association of Great Britain (MIRA) as report No. 1967/5, there is an early suggestion to use an afterburner as a means of reducing pollution, the heat it produces being merely dissipated in a heat sink. The heat sink can of course be the matrix of a catalytic converter so that afterburner may act to reduce the light-off time of the converter.

The use of an afterburner to heat exhaust gases before they reach a catalytic converter has been specifically suggested in U.S. Pat. No. 3,889,464 in which patent the fuel for the afterburner is not derived from the exhaust gases. A development of this idea described in EP A 0 422 432 uses the partly burnt combustion products in the exhaust gases to fuel the afterburner. In the latter proposal, the mixture strength to the engine is enriched by diverting some of the metered air to flow directly into the exhaust pipe.

For the purpose of heating the catalytic converter to reduce its light-off time, the afterburner has been the most effective proposal to date. When the engine is run with a moderately rich mixture and fresh air is added to the hot exhaust gases after the exhaust system has warmed up, it is possible to re-ignite the mixture because a so-called cool flame reaction is still taking place in the exhaust system. This allows the warm-up time to be reduced to less than one minute.

In the prior art proposals, however, one must wait some time after the engine has started before the gases become ignitable in the afterburner. This is because when the engine and the exhaust system are cold, the mixture arriving at the afterburner will have lost most of its heat to the exhaust system and any cool flame reaction taking place in the gases as they left the engine will have been quenched during passage through the cold exhaust manifold and down pipe and will have been quenched further upon injection of the additional cold air into the exhaust gas stream. In the absence of the cool flame reaction which is known to assist ignition, the exhaust/air mixture will not be ignitable. One must wait until the exhaust pipe has warmed to a temperature which enables the cool flame reaction to be sustained until the exhaust gases reach the afterburner. Once the afterburner has fired, the catalytic converter will be heated rapidly to its light-off temperature but during the initial phase before the afterburner is ignited, the exhaust gases are discharged to atmosphere without being cleaned neither by the afterburner nor by the catalytic converter.

OBJECT OF THE INVENTION

The invention therefore seeks to provide a system for igniting an afterburner as quickly as possible after the engine first fires so as to mitigate the foregoing problems of the prior art and minimise the light-off time of the catalytic converter.

SUMMARY OF THE INVENTION

According to the invention, there is provided a method of reducing the total emissions during cold starts from an engine burning a hydrocarbon fuel and having an afterburner arranged upstream of a catalytic converter, the method comprising the steps of:
  adding an excess of fuel to the engine combustible charge and adding air to reach the engine exhaust gases to assure the presence in the exhaust/air mixture immediately after the engine has first fired of sufficient concentrations of hydrogen and oxygen to permit the resulting exhaust/air mixture to be ignitable and to burn with a steady flame in the afterburner while the latter is at a temperature close to the ambient temperature, and
  igniting the exhaust/air mixture in the afterburner immediately after the engine has first fired.

Preferably, the exhaust/air mixture is regulated by varying the excess fuel and/or the additional air after ignition has occurred in the afterburner to maintain a steady flame in the afterburner until at least part of the matrix of the catalytic converter has reached its light off temperature.

The minimum concentrations of hydrogen and oxygen required in an exhaust/air mixture for it to be ignitable in a cold afterburner immediately after the engine has first fired and for it to be capable of sustaining a steady flame, depend on the design of the afterburner and the gas flow conditions through it. The minimum values of hydrogen and oxygen concentrations found experimentally for a well mixed mass of gas sampled from the exhaust/air mixture of an engine and ignited under stationary conditions in a cold combustion bomb were 3% and 6%, respectively. However, in a practical situation of a conventionally designed afterburner where the engine exhaust flow is pulsating, where the mixing with the additional air is not thorough and where the flow conditions around the ignition source are unstable, the hydrogen concentration need to be significantly in excess of 5%, typically 6%, for ignition to be possible. For a steady flame to be sustainable after ignition, lower concentrations can be used but even these must stay well above the minimum values of 3% and 6%, respectively, for hydrogen and oxygen. Throughout the specification, gas concentrations expressed as percentages are given by volume, not by mass.

The importance of hydrogen in the exhaust mixture was not realised in the prior art and hydrogen concentrations were not therefore quoted. One can however deduce from the carbon monoxide concentrations required to achieve the improvements claimed in the prior art that the hydrogen concentration present was less than 3% which is below the minimum flammability limit even under ideal conditions and is significantly less, by a factor of two, than the hydrogen concentration necessary for ignition in a practical afterburner of the present invention.

From this, it will be appreciated that the mechanism of the reaction taking place in the prior art is essentially different from that relied upon in the present invention. The prior art relies on the fact that if the exhaust gases are not allowed to cool down by passage through a cold exhaust system, on arrival in the afterburner, the hot partially burnt constituents are still reacting with one another at a slow rate and under these conditions, combustion can be re-activated with the hot reactive hydrocarbons and carbon monoxide in the exhaust gases, if sufficient oxygen is present and an ignition source is provided.

It was however necessary to run the engine for some time for it to warm up before ignition in the afterburner was possible and during this time unburnt hydrocarbons were discharged from the exhaust system. Increasing the mixture strength and adding air would have increased the thermal reactions between the gases in the exhaust and thereby reduced the warm-up time of the exhaust system. However, this thermal reaction would have made it more difficult for the afterburner to be fired by lowering the concentration of flammable gases in the mixture reaching the afterburner.

Enriching the mixture supplied to the engine still further to increase the concentrations of carbon monoxide and unburnt hydrocarbons in the mixture reaching the afterburner would not have reduced significantly the warm up time (especially when the engine is run at idle speed as required for the first part of the statutory drive cycle), but would have caused a large increase in the concentration of the unburnt hydrocarbons discharged prior to firing of the afterburner and would merely have proved counter-productive.

The teaching of the prior art indicates that whilst the basic operation of the afterburner relies on supplying it with carbon monoxide and hydrocarbons as the fuel, increasing the fuel enrichment supplied to the engine in the early stage of warming up to increase the concentrations of these gases in the exhaust would only increase the total emissions discharged from the exhaust system prior to the afterburner being ignited. The present invention avoids this problem by making use of a different mechanism for igniting the afterburner, recognising for the first time the vital part played by hydrogen if present in sufficient concentration.

The improvement of the invention over the prior art is emphasised by the timing of events following the first firing of the engine. In the prior art, while following a statutory drive cycle over which the exhaust emissions are measured, the afterburner cannot fire during the initial twenty seconds idling period of the drive cycle because the exhaust gases are cold. When the car is driven under load, the temperature of the gases in the afterburner rises rapidly and reaches the level where the afterburner can be ignited after a few more seconds. Once it has fired, the afterburner itself reduces hydrocarbon emissions which allows the mixture strength to be increased further to enhance the amount of heat generated for heating the catalytic converter. The total light-off time of the catalytic converter therefore extends to some thirty seconds or more after the engine first fires.

In the present invention, the mixture strength is enriched during or just after cranking to achieve the necessary hydrogen concentrations and the afterburner ignites at once. For this purpose the fuel enrichment supplied to the engine needs to be very dramatic, calling for the amount of fuel in the combustible charge to be as much as twice the fuel present at stoichiometry. To allow for the fact that because of wall wetting not all the fuel injected forms the combustible charge, the actual level of enrichment may need to be still higher.

In practice, a robust ignition followed by a steady flame totally engulfing the afterburner chamber has been observed in less than one second after the engine first fires. Within five seconds, the front face of the catalytic converter downstream of the afterburner reaches red heat and the afterburner has to be extinguished to prevent overheating of the catalyst.

Thus, in the invention, despite the significant over fuelling of the engine, the total emissions are reduced because the afterburner acts immediately to react the unburnt hydrocarbons before they are discharged to atmosphere and as soon as the afterburner is extinguished the catalytic converter itself takes over the task of purifying the discharged exhaust gases. In the prior art, on the other hand, untreated gases are discharged to atmosphere during approximately the first thirty seconds of engine operation, when the hydrocarbon emissions are at their worst and account for a major proportion of the emissions given off during the entire drive cycle.

It will assist clearer understanding of the invention to delve deeper into the nature of the gases in the exhaust/air mixture arriving at the afterburner. During starting with a rich mixture, the exhaust gases contain combustible constituents including carbon monoxide, unburnt hydrocarbons and hydrogen, and diluent gases including carbon dioxide, nitrogen and water. The presence of hydrogen in the exhaust gases has not been appreciated in the prior art because hydrogen is not itself a combustion product as it would normally burn in preference to any other gas present. The reason for the presence of hydrogen is that under high temperatures and pressures after the rich combustion inside the engine combustion chamber, the combustion products contain, among other constituents, a mixture of carbon monoxide and steam which undergoes an equilibrium reaction, $$CO + H_2O \rightleftharpoons CO_2 + H_2$$

known as the water gas reaction. The hydrogen generated by this process is subsequently frozen when the temperature and pressure suddenly drop on expansion as the gases are expelled during the engine exhaust stroke. This hydrogen will be present in the exhaust gases and its concentration will depend on the H/C ratio of the hydrocarbon fuel and the concentration of carbon monoxide produced during the rich combustion.

Each of the combustible constituents in the exhaust gases has a threshold concentration (flammability limit) below which it cannot form an ignitable mixture when cold. When air is mixed with the exhaust gases, the oxygen present in the mixture must also reach a threshold concentration which is unique for each fuel constituent to make it ignitable. It should be kept in mind that as fresh air is added to the exhaust gas stream, the concentration of the combustible constituents in the mixture is lowered and the concentration of oxygen in the mixture is shared between the air and the exhaust gases.

It is found that with respect to the unburnt hydrocarbons and carbon monoxide concentrations and the oxygen concentration in the exhaust/air mixture, the engine cannot produce, even with an extremely rich fuel calibration, enough quantities of these constituents in the exhaust gases mixed with the additional air to reach the threshold concentrations simultaneously to form an ignitable mixture under ambient temperatures. For these reasons, the invention cannot be arrived at by extrapolation from the results achieved in the prior art.

Instead, the invention is based on the discovery that by supplying a very rich mixture to the engine, a sufficient quantity of hydrogen will be present in the exhaust gases which when mixed with additional air can simultaneously achieve hydrogen and oxygen concentrations which are well within the flammability limit for hydrogen at ambient temperature. It is therefore possible to achieve immediate ignition in the afterburner, by supplying to the engine the necessary excessively rich mixture abruptly and circumventing the operating regime of the prior art.

It should be appreciated that once ignited, the afterburners of both the prior art and the present invention will perform equally efficiently and will heat the catalytic converter rapidly to its light-off temperature within a few seconds. The fundamental difference between the prior art and the invention lies in the mechanism used to achieve ignition. By using hydrogen, ignition is instantaneous and is not dependent on the rate of warm up of the exhaust system. Furthermore, it has been confirmed by experiment that the invention is effective for a wide range of ambient temperatures, including sub-zero temperatures.

The severe fuel enrichment supplied to the engine can however cause uneven running of the engine and heavy carbon deposits in the engine combustion chamber. It is therefore preferred to reduce the extent of enrichment soon after ignition in the afterburner, the resulting hydrogen and oxygen concentrations still remaining well above 3% and 6%, respectively, to permit a stable flame to be sustained.

The afterburner may be operated simultaneously with the cranking of the engine as the invention is capable of achieving ignition of the afterburner immediately after the engine fires. It is not however essential to calibrate the engine with an excessively rich mixture before cranking and this may be carried out immediately after the engine has fired. This may be required if the extra rich mixture interferes with the starting of the engine.

In a homogeneous-charge spark-ignited internal combustion engine, excess hydrogen in the exhaust can be ensured by supplying an excessively rich mixture to the engine.

The method of implementing the invention may be slightly different when applied to a stratified-charge engine. Examples of such engines are those in which fuel is injected directly into the combustion chambers, such as the FORD PROCO four stroke engine, the ORBITAL two stroke engine and diesel engines.

The effect of charge stratification is to create within the combustion chamber regions of rich and weak mixture strengths. The rich regions are responsible for creating the hydrogen and the weak regions contribute to the presence in the exhaust system of the oxygen required to mix with the hydrogen to form an ignitable mixture. In such an engine, it may not prove necessary to enrich the mixture nor indeed to introduce additional air into the exhaust system. It may however be necessary to throttle the intake in order to reduce the air content in the combustion chamber.

In an in-cylinder injected two-stroke engine, delayed injection timing results in fuel entering the exhaust system directly and this technique may be used to augment the amount of heat released after the afterburner has been fired.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
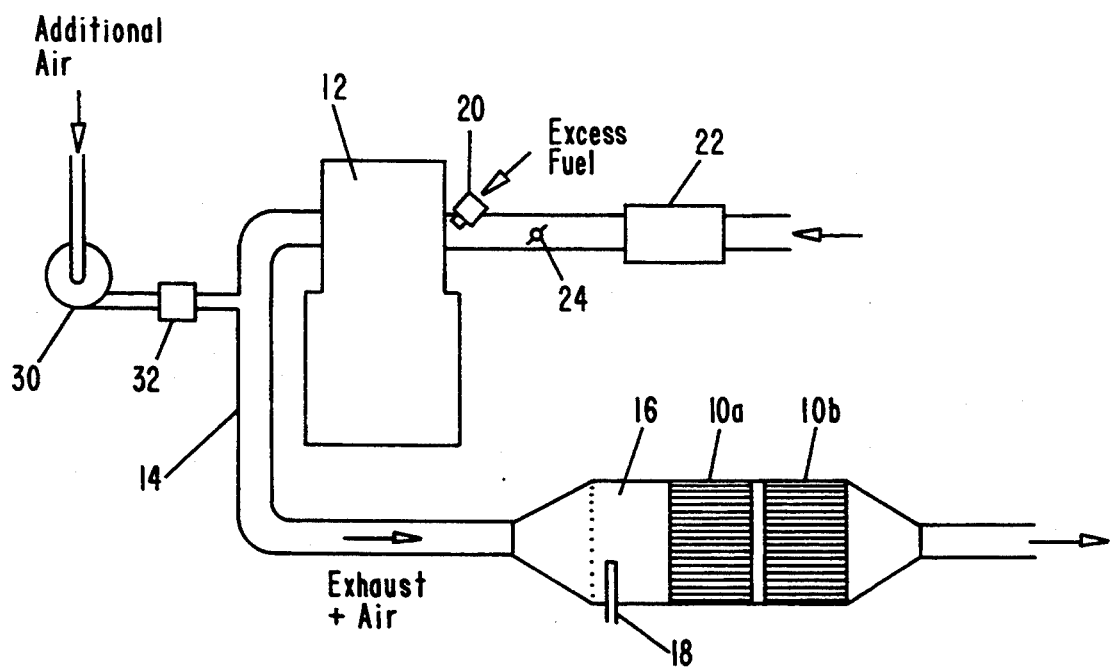
FIG. 1 shows schematically an engine together with its intake and exhaust system for implementing the invention.

FIG. 1 shows an engine 12 to which air is supplied through an air flow meter 22, the air supply being regulated by a butterfly throttle 24. Fuel is introduced into the air stream by an injector 20. The exhaust gases from the engine are conducted by a pipe 14 to a catalytic converter, made up of two bricks 10a and 10b, which is preceded by an afterburner 16 having a spark igniter 18. Air is added to the exhaust gas stream in the exhaust pipe 14 by a pump 30, the additional air flow being regulated by a valve 32.

During normal operation, the engine runs with a stoichiometric fuel to air ratio and no air is added to the exhaust stream. The afterburner 16 is ineffective and the three-way catalytic converter will work satisfactorily to clean the exhaust gases in the normal manner. Once the chemical reaction within the converter has been started by the converter having reached its light-off temperature, the temperature of the exhaust gases assisted by the exothermic reaction taking place within the converter serves to maintain the converter at a suitably high temperature for it to operate correctly without assistance from the afterburner 16.

The purpose of the afterburner 16 is to reduce the light-off time of the catalytic converter 10a, 10b. During starting the engine is run rich by introducing excess fuel through the injector 20 to ensure that the exhaust gas stream contains combustible constituents, additional air is introduced by the pump 30 to mix with these constituents to form a combustible mixture and the spark igniter 18 in the afterburner 16 ignites the mixture to produce a flame which heats up the converter brick 10a. The invention is concerned with the control of the excess fuel and additional air to ensure that the mixture in the afterburner 16 ignites as soon as possible after the engine first fires.

Figure 2:
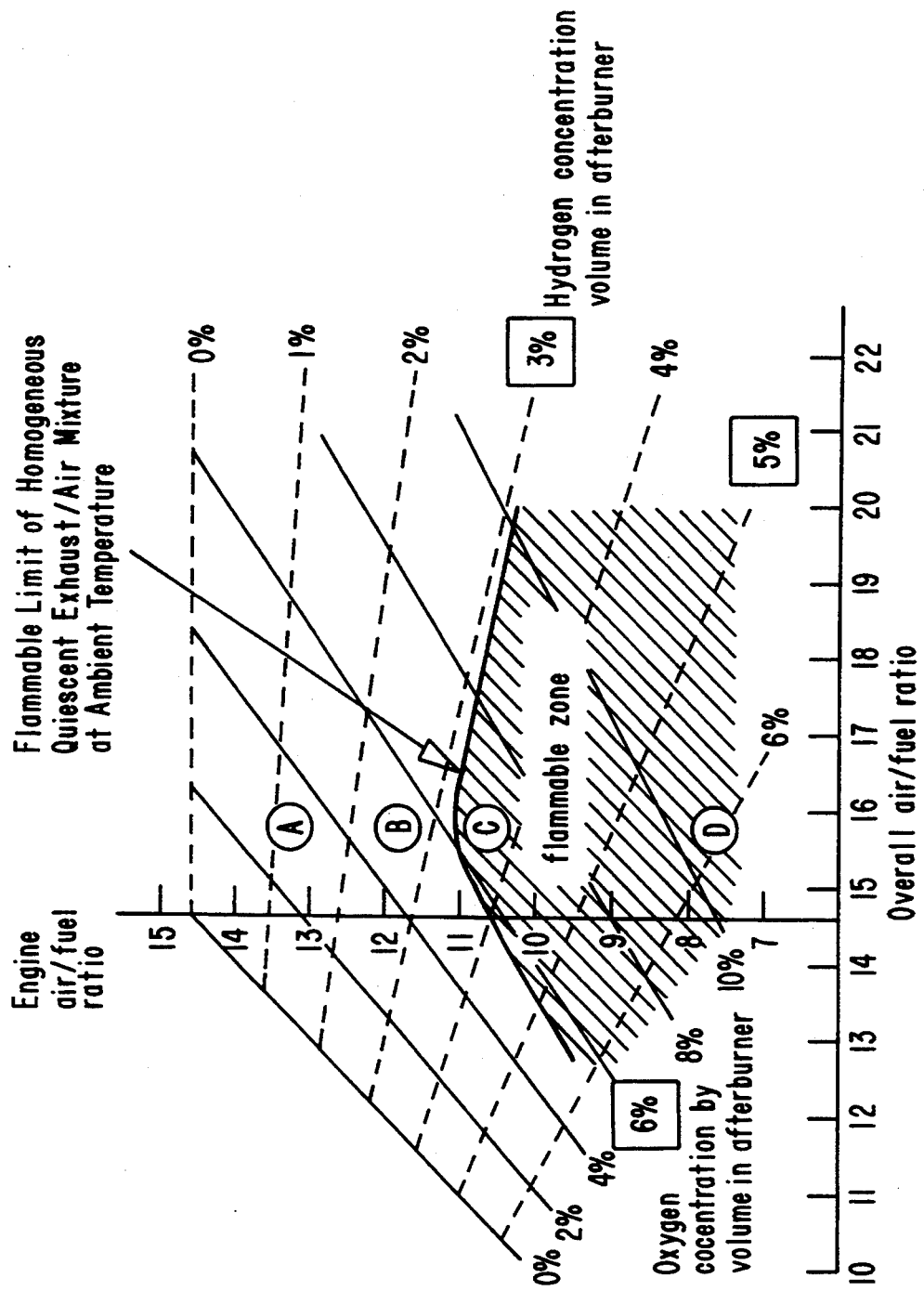
FIG. 2 is a graph showing the variation of the hydrogen and oxygen concentrations in the afterburner with the air/fuel ratio supplied to the engine alone and air/fuel ratio supplied to the engine and exhaust system combined.

FIG. 2 shows a map of how the concentrations of hydrogen and oxygen in the afterburner vary with the air to fuel mixture supplied to the engine alone and the overall air to fuel mixture supplied to the engine and exhaust system combined. The vertical axis of the map represents a range of rich mixtures supplied to the engine, the right hand side of the horizontal axis represents a range of overall lean mixtures when the additional air in the exhaust is included in the total air to fuel chemical balance. The afterburner should always be operated within the region on the right hand side of the vertical axis to ensure that there is excess air in the afterburner to react with all the combustible gases of hydrogen, carbon monoxide and hydrocarbons completely.

In the map of FIG. 2, there are lines drawn of constant oxygen and constant hydrogen concentrations in the afterburner under different operating conditions of the engine and afterburner. Lines of constant carbon monoxide and constant hydrocarbons in the afterburner may also be drawn in this map but they have been omitted. This invention has identified the presence of hydrogen and oxygen as the main criteria for determining the flammability of the exhaust/air mixture at ambient temperature when the latter also contains flammable proportions of carbon monoxide and hydrocarbons along with non-flammable diluents of carbon dioxide, nitrogen and water. By collecting samples of the exhaust/air mixture from the afterburner under different operating conditions and attempting to ignite it after thorough mixing and under stationary conditions in a cold combustion bomb, a limiting curve (flammability limit) bordering the shaded region in the map may be identified where the exhaust/air mixture is ignitable under ideal conditions at ambient temperature.

It can be seen from FIG. 2 that the minimum conditions for ignitability of the exhaust/air mixture are that the hydrogen concentration must exceed 3% by volume at the same time as the oxygen concentration exceeds 6% by volume, for example at the point C. To put the prior art in perspective, the operating point A was that used to achieve a thermal reaction in the exhaust system and the point B was that used to ignite an afterburner when the exhaust gases were kept hot and reactive. Neither of these points will support cold ignition of the exhaust gases. Even point C does not support cold ignition in practice because of the less than ideal mixture conditions in a conventionally designed afterburner and one must in a practical engine resort to the point D (where the hydrogen concentration exceeds 5% and is more typically 6%) to achieve reliable cold ignition. Once ignition has occurred, one can reduce the fuel enrichment to return to a point nearer the point C, but even then one cannot operate satisfactorily too near to the limit of flammability as this risks the flame being extinguished.

It should be appreciated that the absolute values of air to fuel ratio indicated in the map in FIG. 2 would be different for different fuels depending on the stoichiometry of the fuel. However absolute values of the hydrogen and oxygen concentrations necessary for reliable ignition and stable burning in the afterburner at ambient temperature would remain the same regardless of the type of hydrocarbon fuel used.

Figure 3:
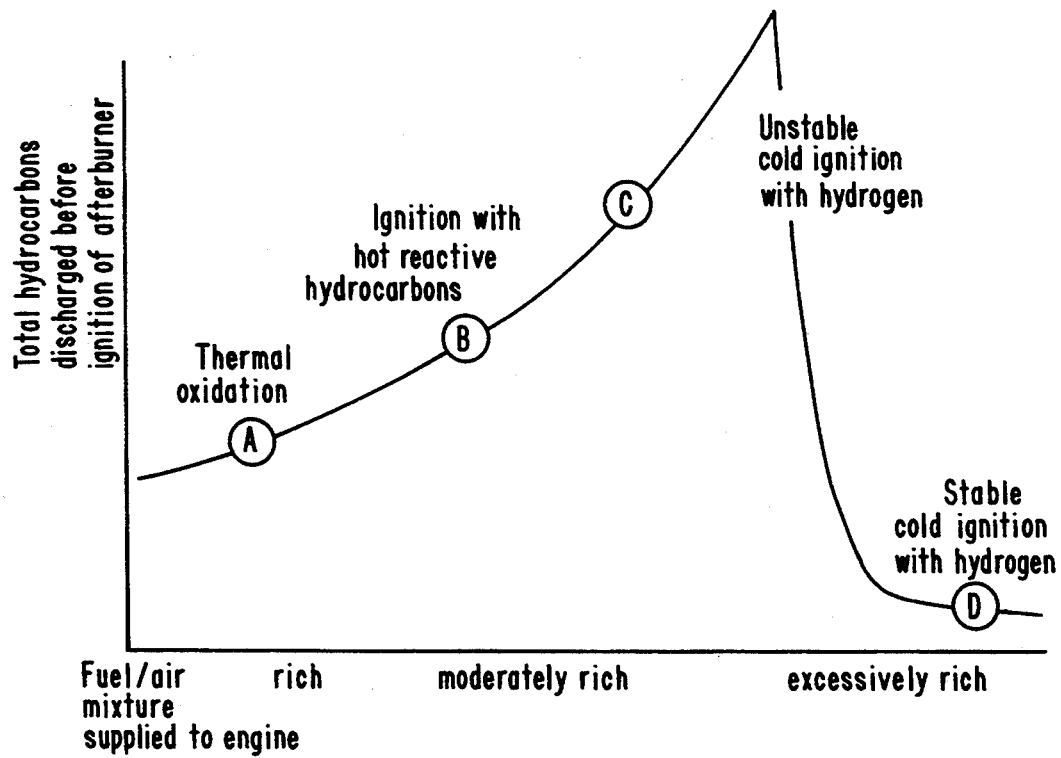
FIG. 3 is a graph showing the total emissions from an engine having an afterburner during the start-up phase of the statutory drive cycle plotted against the fuel/air ratio supplied to the engine.

The improvement achieved by the invention is well demonstrated by the graph of FIG. 3 in which the total emissions during the start up phase of the statutory drive cycle are shown plotted against increasing fuel to air ratio supplied to the engine, the different operating points A to D of FIG. 2 being shown on the graph. As the mixture is enriched from A to B to C, one does not succeed in igniting the afterburner until after the engine is put under load after the first twenty seconds idling period of the statutory drive cycle. Throughout this time, untreated exhaust gases will continue to be discharged to atmosphere and the concentration of hydrocarbons they contain rises with increasing fuel enrichment. If the mixture is enriched even further, to a certain threshold value at which the hydrogen concentration present in the exhaust gases is sufficient to overcome the less than ideal mixture conditions in the afterburner, immediate ignition becomes possible, but combustion may be somewhat unstable. By ensuring this threshold value is safely exceeded, for example at the point D, immediate ignition and stable combustion are ensured by the much higher concentration of hydrogen present and the emissions discharged to atmosphere are reduced very rapidly as a result of the burning in the afterburner which disposes the bulk of the emissions prior to the light-off of the catalytic converter. After light-off, the catalytic converter takes over the task of purifying the exhaust gases. The critical period when neither the afterburner nor the catalytic converter is operational is thus reduced to a minimum.

The prior art never progressed to the point at which the abrupt change, signalling the transition to a different mechanism of ignition by hydrogen, depicted in FIG. 3 was noted. Without appreciating the vital role played by hydrogen for ignition and the threshold condition that must be exceeded in order to achieve it, any step by step extrapolation of the prior art with discrete increments in the fuel enrichment would not have altered the mechanism of ignition but would merely have increased the emissions and prolonged the rough running and heavy sooting of the engine. This would in turn have caused serious drivability problems and would have resulted in enough emissions during this initial phase alone to exceed the permitted limit for the entire statutory drive cycle. All these factors would have deterred attempts at the very high fuel enrichment contemplated in the present invention. The preferred embodiment of the present invention calls for a large and abrupt excursion to the necessary excessively rich mixture, but only for a brief period, and this achieves an immediately ignitable mixture in the afterburner which circumvents the disadvantages of the prior art.

We claim:

1. A method of reducing during cold starts the total noxious emissions from an engine burning a combustible charge having a hydrocarbon fuel and having an afterburner arranged upstream of a catalytic converter in the exhaust flow from the engine, the method comprising the steps of:
    adding an excess of fuel to the engine combustible charge and adding air to reach the engine exhaust gases to assure the presence in an exhaust/air mixture, immediately after the engine has first fired, of sufficient concentrations of hydrogen and oxygen to permit the exhaust/air mixture to be ignitable and to burn with a steady flame in the afterburner while the later is at a temperature close to the ambient temperature, and
    igniting the exhaust/air mixture in the afterburner immediately after the engine has first fired.

2. A method as claimed in claim 1, wherein the exhaust/air mixture is regulated by varying the excess fuel and/or the additional air after ignition has occurred in the afterburner to maintain a steady flame in the afterburner until at least part of the matrix of the catalytic converter has reached its light off temperature.

3. A method as claimed in claim 1, wherein, at or immediately prior to ignition, the hydrogen content of the exhaust/air mixture is in excess of 5% by volume and the oxygen concentration is at least 6% by volume.

4. A method as claimed in claim 3, wherein, following ignition, the hydrogen concentration in the exhaust/air mixture is reduced while remaining above 3% by volume, the oxygen concentration remaining above 6% by volume.

5. A method as claimed in claim 3, wherein the fuelling is varied to cause the hydrogen concentration to switch abruptly between low and high concentration values.

6. A method as claimed in claim 1, in which an ignition source is continuously operated during the time that the flame in the afterburner is to be maintained.

7. A method as claimed in claim 1, in which the excess of fuel is supplied to the engine and sufficient air is added to the exhaust gases during cranking.

8. A method as claimed in claim 1, in which the excess of fuel is supplied to the engine and sufficient air is added to the exhaust gases only after cranking, when the engine has first fired.

9. A method as claimed in claim 3, in which the flame in the afterburner is extinguished after a predetermined length of time sufficient for the catalytic reaction in the catalytic converter to commence.

10. A method as claimed in claim 1, wherein the engine is a homogeneous-charge spark-ignited internal combustion engine and the presence of hydrogen in the exhaust is ensured by supplying an excessively rich homogeneous mixture to the engine, extra air being added directly into the exhaust gas stream.

11. A method as claimed in claim 1, wherein the engine is a stratified-charge engine, the charge stratification creating within the combustion chamber regions of excessively rich and less rich mixture strengths, the former being responsible for generating the hydrogen and the latter at least contributing to the presence in the exhaust system of the oxygen required to form an ignitable mixture.

12. A method as claimed in claim 11, wherein charge stratification is achieved by injecting fuel directly into the combustion chamber.

13. A method as claimed in claim 1, wherein the engine is a spark ignition engine.

14. A method as claimed in claim 1, wherein the engine is a compression ignition engine.

15. A method as claimed in claim 1, wherein the engine is a two-stroke engine.

* * * * *